United States Patent [19]

Oka

[11] Patent Number: 5,254,670

[45] Date of Patent: Oct. 19, 1993

[54] POLYANILINE DERIVATIVES AND THEIR PRODUCTION PROCESS

[75] Inventor: Osamu Oka, Shizuoka, Japan

[73] Assignee: Tomoegawa Paper Co., Ltd., Tokyo, Japan

[21] Appl. No.: 693,867

[22] Filed: Apr. 30, 1991

[30] Foreign Application Priority Data

| May 2, 1990 | [JP] | Japan | 2-115163 |
| May 11, 1990 | [JP] | Japan | 2-119699 |
| Mar. 25, 1991 | [JP] | Japan | 3-83023 |
| Mar. 25, 1991 | [JP] | Japan | 3-83024 |
| Mar. 25, 1991 | [JP] | Japan | 3-83025 |

[51] Int. Cl.$^5$ ............................................. C08L 79/00
[52] U.S. Cl. ........................................ 528/373; 528/391; 528/422
[58] Field of Search ............... 528/373, 390, 391, 397, 528/422

[56] References Cited

U.S. PATENT DOCUMENTS 4,629,540 12/1986 Geniees et al. .................. 204/59
4,851,487 7/1989 Yaniger et al. .................. 252/500

OTHER PUBLICATIONS

Abe et al, Chem. Soc., Chem. Commun., 1989, pp. 1736–1738.
Dao et al, Synthetic Metals, 29(1989)E377–E382.
Dao et al, Synthetic Metals, 29(1989)E383–E388.
Wei et al., J. Phys. Chem. 1989, 93, 495–499.

*Primary Examiner*—John Kight, III
*Assistant Examiner*—Jeffrey Culpeper Mullis
*Attorney, Agent, or Firm*—Lowe, Price, LeBlanc & Becker

[57] ABSTRACT

Novel polyaniline derivatives soluble in general organic solvents are provided without impairment of the inherent good properties of the corresponding polyanilines. The novel polyaniline derivatives are polymers represented by the following formula (I):

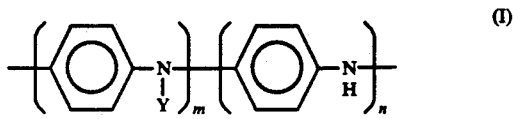

wherein Y means a group represented by the following formula: $R_1CO-$, $R_2S-$, $R_2SO-$, $R_2SO_2-$ or $R_5+O-R_4)_kOR_3-$, $R_1$ through $R_5$ being particular substituent groups, k is an integer of 0–5, and n and m independently represent polymerization degree and are integers satisfying the following equations: $m/(n+m)=0.01-1$ and $n+m=20-1000$. They can each be produced by reacting a halide, which is represented by the following formula: Y-X wherein Y has the same meaning as described above and X means a chlorine or bromine atom, to a reduced polyaniline.

3 Claims, No Drawings

POLYANILINE DERIVATIVES AND THEIR PRODUCTION PROCESS

BACKGROUND OF THE INVENTION

1. Field of the invention

The present invention relates to novel polyaniline derivatives soluble in organic solvents and also to their production process.

2. Description of the Related Art

Investigation has been conducted in recent years with a view toward applying polyanilines as new electronic materials or electroconductive materials in a wide variety of fields such as cell electrode materials, antistatic materials, electromagnetic shielding materials, functional devices—e.g., photoelectric transducers, optical memories and various sensors—, display devices, various hybrid materials, transparent electroconductors, and various terminal equipment.

Polyanilines however have a highly developed $\pi$-conjugated system. They are hence accompanied by the serious drawbacks that they are insoluble in most organic solvents and do not melt even when heated due to having a rigid main chain and the existence of strong interaction and many strong hydrogen bonds between polymer chains and also have poor moldability and permit neither cast molding nor coating.

They are therefore formed, for example, into electroconductive composite materials by impregnating base materials of a desired shape—such as fibers, porous bodies or the like of high-molecular materials—with their corresponding aniline monomers and then bringing the monomers into contact with a suitable polymerization catalyst or subjecting the monomers to electropolymerization to polymerize the monomers. As an alternative, such aniline monomers are polymerized in the presence of powder of a thermoplastic polymer to obtain similar composite materials.

In the meantime, polyanilines soluble in N-methyl-2-pyrrolidone alone have also been synthesized by suitably by choosing the polymerizaiton catalyst and reaction temperature [M. Abe et al.: J. Chem. Soc., Chem. Commun., 1736 (1989)]. These polyanilines are however practically insoluble in other general organic solvents so that their application field is limited.

SUMMARY OF THE INVENTION

The present invention has been completed with a view toward overcoming the problems described above. An object of the present invention is therefore to provide a novel polyaniline derivative, which is soluble in general organic solvents, without impairment of the good inherent properties of the corresponding polyaniline. Another object of the present invention is to provide a process for producing the novel polyaniline derivatives.

The present inventors have carried out an extensive investigation with a view toward overcoming the problems described above. As a result, it has been found that these problems can be overcome by introducing a particular substituent group to one or more nitrogen atoms of the polyaniline, leading to the completion of the present invention.

Each polyaniline derivative according to the present invention is a novel polymer and is represented by the following formula (I):

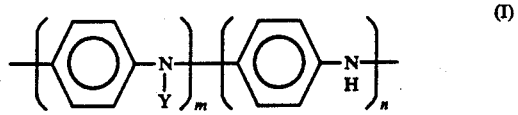

wherein Y means a group represented by the following formula: $R_1CO-$, $R_2S-$, $R_2SO-$, $R_2SO_2-$ or $R_5-(O-R_4)_k OR_3-$, $R_1$ being a substituted or unsubstituted alkyl group having at least 4 carbon atoms, a cycloalkyl group having at least 4 carbon atoms or an alkenyl group having at least 4 carbon atoms, $R_2$ being a substituted or unsubstituted alkyl group having at least 2 carbon atoms, a substituted or unsubstituted alkenyl group, a substituted or unsubstituted aryl group or a substituted or unsubstituted benzyl group, $R_3$ being a linear or branched alkylene group having 1-22 carbon atoms, $R_4$ beig a linear or branched alkylene group having 1-22 carbon atoms, $R_5$ being a substituted or unsubstituted alkyl group having 1-22 carbon atoms or a cycloalkyl group, and k is an integer of 0-5, and n and m independently represent polymerization degrees and are integers satisfying the following equations: $m/(n+m)=0.01-1$ and $n+m=20-1000$.

The above polyaniline derivatives of the present invention can be produced in the following manner. Namely, a halide represented by the below-described general formula (II) is reacted to a reduced polyaniline to introduce a residual group of the halide as a substiuent group to one or more nitrogen atoms of the reduced polyaniline:

Y-X (II)

wherein Y has the same meaning as defined above and X is a bromine or chlorine atom.

Described in more detail, a polyaniline is treated with ammonia to convert the polyaniline to a soluble polyaniline, which is then treated with excess hydrazine to convert it to a reduced polyaniline. After the reduced polyaniline is thereafter dissolved in an amide solvent or dispersed in an aromatic solvent or an ether solvent, the halide represented by the above formula (II) is added to introduce the substituent group to one or more of the nitrogen atoms of the reduced polyaniline.

The production process of the present invention permits direct introduction of the substituent group to one or more of the nitrogen atoms of the reduced polyaniline so that the substituent group can be introduced in a desired proportion. A polyaniline derivative, which is soluble in organic solvents and has excellent processability such as film formability or coating applicability, can therefore be produced without impairment of the inherent good properties of the corresponding polyaniline.

DETAILED DESCRIPTION OF PREFERRED EMBODIMENTS

The present invention will hereinafter be described in detail.

Usable for the production of the polyaniline derivative according to the present invention a polyaniline is provided which has been obtained by oxidative polymerization of aniline using ammonium persulfate or the like as oxidizing agents at a low temperature, for example, in the range of from $-20°$ C. to $50°$ C. and which has a polymerization degree of 20-1000, preferably 50–200. First of all, the polyaniline is treated with ammonia to convert it to a soluble polyaniline. The soluble polyaniline is then treated with excess hydrazine to prepare a reduced polyaniline. The term "reduced polyaniline" means a reduced product of the above polyaniline as obtained by the oxidative polymerization, said reduced product containing a hydrogen atom bonded to each of all nitrogen atoms contained in the polyaniline. The hydrazine treatment can be effected by dispersing the soluble polyaniline in water, adding hydrazine in an amount at least equivalent to, preferably three times the nitrogen atoms in the polyaniline in a nitrogen atmosphere and then stirring the resultant mixture at 0°–30° C. for 24 hours.

The reduced polyaniline thus obtained is soluble in N-methyl-2-pyrrolidone or N,N-dimethylacetamide but is practically insoluble in other general organic solvents, for example, chloroform and tetrahydrofuran.

Next, the halide represented by the formula (II) is caused to act on the reduced polyaniline to effect a substitution reaction. The substitution reaction can be conducted by dissolving the reduced polyaniline in an amide solvent or dispersing it in an aromatic solvent or ether solvent, adding the halide represented by the formula (II) to the resultant solution or dispersion and then stirring the thus-obtained mixture in a temperature range of from $-10°$ C. to $100°$ C. in a nitrogen atmosphere.

Usable, exemplary amide solvents include N-methyl-2-pyrrolidone, N,N-dimethylacetamide, N,N-dimethylformamide, hexamethyl phosphoric triamide and 1,3-dimethyl-2-imidazolidinone. Usable, illustrative aromatic solvents include benzene, toluene, xylene, ethylbenzene and tetralin. On the other hand, usable examples of the ether solvent include ether, tetrahydrofuran and dioxane.

Examples of the halide represented by the formula (II) include compounds represented by the following formulae (IIA)–(IIE), respectively:

$$R_1COX \quad (IIA)$$

$$R_2SX \quad (IIB)$$

$$R_2SOX \quad (IIC)$$

$$R_2SO_2X \quad (IID)$$

$$R_5-O-R_4)_kOR_3-X \quad (IIE)$$

wherein $R_1$, $R_2$, $R_3$, $R_4$, $R_5$, X and k have the same meanings as defined above.

Examples of $R_1$ in the acyl halide represented by the formula (IIA) include linear alkyl groups such as butyl, pentyl, hexyl, heptyl, octyl, nonyl, decyl, undecyl, dodecyl, hexadecyl and docosyl; branched alkyl groups such as isobutyl, isopentyl, neopentyl and isohexyl; cyclic alkyl groups such as cyclohexyl; and alkenyl groups such as butenyl, pentenyl and hexenyl. One or more of the hydrogen atoms of these groups may be substituted by a like number of halogen atoms and/or cyano, nitro, phenyl, alkoxyl and/or hydroxyl groups.

Examples of $R_2$ in the sulfenyl halide, sulfinyl halide and sulfonyl halide represented by the formulae (IIB)–(IID), respectively, include the following groups:

Substituted or unsubstituted alkyl groups having 2 or more carbon atoms, for example, linear alkyl groups such as ethyl, propyl, butyl, pentyl, hexyl, heptyl, octyl, nonyl, decyl, undecyl, dodecyl, hexadecyl and docosyl; branched alkyl groups such as isobutyl, isopentyl, neopentyl and isohexyl; and those obtained by substituting one or more of their hydrogen atoms with a like number of halogen atoms and/or cyano, nitro, alkoxyl and hydroxyl groups.

Exemplary, substituted or unsubstituted alkenyl groups include butenyl, pentenyl and hexenyl groups and those obtained by substituting one or more of their hydrogen atoms by a like number of alkyl, phenyl, cyano, nitro and/or hydroxyl groups and/or halogen atoms.

Illustrative, substituted or unsubstituted aryl groups include a phenyl group and those obtained by substituting one or more of the hydrogen atoms of a phenyl group with a like number of halogen atoms and/or cyano, nitro, alkoxyl and/or hydroxyl groups.

Examples of one or more substituent groups in the substituted benzyl group include halogen atoms and/or cyano, nitro and akoxyl groups.

Examples of $R_3$ and $R_4$ in the halogenated alkyl ether or halogenated polyalkyl ether represented by the formula (IIE) include linear or branched alkylene groups having 1–22 carbon atoms, with methylene, ethylene and propylene groups being preferred. Further, illustrative examples of the substituted or unsubstituted alkyl or cyclo alkyl group having 1–22 carbon atoms include linear alkyl groups such as methyl, ethyl, propyl, butyl, pentyl, hexyl, heptyl, octyl, nonyl, decyl, undecyl, dodecyl, hexadecyl and docosyl; branched linear alkyl groups such as isobutyl, isopentyl, neopentyl and isohexyl; and a cyclohexyl group. They may contain, for example, one or more cyano, nitro and/or hydroxyl groups.

Preferred, specific examples of the acyl halide represented by the formula (IIA) include 1-octanoyl chloride, 1-hexanoyl chloride and 2-methylheptanoyl chloride.

Preferred, specific examples of the sulfenyl halide represented by the formula (IIB) include 1-octanesulfenyl chloride, p-toluenesulfenyl chloride and o-nitrophenylsulfenyl chloride.

Preferred, specific examples of the sulfinyl halide represented by the formula (IIC) include 1-butanesulfinyl chloride, 1-octanesulfinyl chloride, p-toluenesulfinyl chloride, benzylsulfinyl chloride and benzenesulfinyl chloride.

Preferred, specific examples of the sulfonyl halide represented by the formula (IID) include 1-butanesulfonyl chloride, 1-octanesulfonyl chloride, p-toluenesulfonyl chloride, benzylsulfonyl chloride and benzenesulfonyl chloride.

Further, preferred, specific examples of the halogenated alkyl ether or halogenated polyalkyl ether represented by the formula (IIE) include 2-bromoethyl ethyl ether, diethylene glycol bis(2-chloroethyl)ether, and polyethylene glycol bis(2-bromoethyl)ether (k=5).

In the present invention, the substitution reaction by the halide can be conducted preferably in such a manner that substituent groups can be introduced to at least 1% of the nitrogen atoms of the reduced polyaniline.

It is desirable to subject the N-substituted polyaniline derivative, which has been obtained as described above, to undoping treatment as a post treatment with aqueous ammonia.

Each polyaniline derivative according to the present invention, which can be produced as described above, is represented by the formula (I) and is soluble not only in N-methyl-2-pyrrolidone and N,N-dimethylacetamide but also in halogenated hydrocarbon solvents such as chloroform, dichloroethane and dichlor omethane and ether solvents such as tetrahydrofuran. Using a solution of the polyaniline in one of these solvents, a good self-standing film can be obtained by casting. The films so formed shows conductivity as high as $10^{-3}$–$10^1$ S/cm after it has been doped in a protonic acid such as hydrochloric acid, sulfuric acid, fluoboric acid or perchloric acid.

The hue of each novel polyaniline derivative of the present invention varies depending on the polarity of each solvent, thereby making it possible to use the polyaniline derivative as a polarity indicator material for solvents. The hue also varies depending on the hydrogen ion concentration, so that the polyaniline derivative can also be used as a hydrogen ion detector.

The present invention will hereinafter be described by following examples.

EXAMPLES

Example 1

Aniline (4.1 g) and concentrated hydrochloric acid (21.9 g) were dissolved in water to give an aniline solution (100 ml). The aniline solution was chilled to $-5°$ C. Concentrated hydrochloric acid (21.9 g) and ammonium persulfate (6.28 g) were also dissolved in water to give a solution (100 ml). The latter solution was also chilled to $-5°$ C. and was then slowly added dropwise to the aniline solution, followed by stirring at $-5°$ C. for 4 hours. The thus-obtained polyaniline having a number average molecular weight of 12,000 (as measured by GPC in N-methyl-2-pyrrolidone as a solvent and converted relative to polystyrene) was washed thoroughly with water, followed by undoping treatment with aqueous ammonia.

The resulting soluble polyaniline was dispersed in water (200 ml), followed by the addition of hydrazine (50 ml) in a nitrogen atmosphere. The mixture thus obtained was continuously stirred for 24 hours at room temperature. The resultant solid precipitate was collected by filtration and then dried, whereby a reduced polyaniline of a grayish white color was obtained.

The reduced polyaniline (1 g) so obtained was completely dissolved in N-methyl-2-pyrrolidone (20 ml). After the reaction system having been thoroughly purged with nitrogen gas, octanoyl chloride (0.5 g) was added. The mixture was stirred for 6 hours so that they were reacted. The reaction mixture was poured into water (1 liter) while the resulting mixture was stirred. The resulting precipitate was collected by filtration, dried and then subjected to undoping treatment with aqueous ammonia, whereby a polyaniline derivative with amidated nitrogen atoms was obtained in an amount of 1.3 g. The amidation of the reduced polyaniline was confirmed by the existence of an absorption at 1660 cm$^{-1}$ in an infrared absorption spectrum. From the yield of the reaction, the degree of substitution at the nitrogen atoms was found to be 30%.

The polyaniline derivative was soluble in N-methyl-2-pyrrolidone and also showed high solubility in organic solvents such as chloroform, dichloroethane, dichloromethane and tetrahydrofuran. From a solution of the polyaniline derivative in chloroform, a self-standing film was saLisfactorily obtained by casting. Its conductivity was 0.1 S/cm after having been doped with sulfuric acid.

Further, the film before the doping was successfully dissolved in organic solvents such as N-methyl-2-pyrrolidone, N,N-dimethylacetamide, chloroform, dichloroethane, dichloromethane and tetrahydrofuran.

EXAMPLE 2

A polyaniline derivative with amidated nitrogen atom (1.15 g) was obtained in a similar manner to Example 1 except that 1-hexenoyl bromide (0.2 g) was used in lieu of octanoyl chloride. The amidation of the reduced polyaniline was confirmed by the existence of an absorption at 1660 cm$^{-1}$ in an infrared absorption spectrum. From the yield of the reaction, the degree of substitution at the nitrogen atoms was found to be 13%.

The polyaniline derivative was soluble in N-methyl-2-pyrrolidone and also showed high solubility in organic solvents such as chloroform, dichloroethane, dichloromethane and tetrahydrofuran. From a solution of the polyaniline derivative in chloroform, a self-standing film was successfully obtained by casting. Its conductivity was 0.05 S/cm after having been doped with sulfuric acid.

Further, the film before the doping was successfully dissolved in organic solvents such as N-methyl-2-pyrrolidone, N,N-dimethylacetamide, chloroform, dichloroethane, dichloromethane and tetrahydrofuran.

EXAMPLE 3

A polyaniline derivative with amidated nitrogen atoms (1.15 g) was obtained in a similar manner to Example 1 except that 2-methylheptanoyl choride (0.2 g) was used in lieu of octanoyl chloride. The amidation of the reduced polyaniline was confirmed by the existence of an absorption at 1660 cm$^{-1}$ in an infrared absorption spectrum. From the yield of the reaction, the degree of substitution at the nitrogen atoms was found to be 11%.

The polyaniline derivative was soluble in N-methyl-2-pyrrolidone and also showed high solubility in organic solvents such as chloroform, dichloroethane, dichloromethane and tetrahydrofuran. From a solution of the polyaniline derivative in chloroform, a self-standing film was successfully obtained by casting. Its conductivity was 0.03 S/cm after having been doped with sulfuric acid.

Further, the film before the doping was successfully dissolved in organic solvents such as N-methyl-2-pyrrolidone, N,N-dimethylacetamide, chloroform, dichloroethane, dichloromethane and tetrahydrofuran.

EXAMPLE 4

A reduced polyaniline (1 g) obtained in a similar manner to Example 1 was completely dissolved in N-methyl-2-pyrrolidone (30 ml). After the reaction system having been thoroughly purged with nitrogen gas, p-toluenesulfenyl chloride (0.87 g; 50 mol % relative to the nitrogen atoms of the reduced polyaniline) was added, followed by stirring for 6 hours so that they were reacted. The reaction mixture was poured into water (1 liter) while the resulting mixture was stirred. The resulting precipitate was collected by filtration, dried and then subjected to undoping treatment with aqueous ammonia, whereby a polyaniline derivative with sulfenamidated nitrogen atoms was obtained in an amount of 1.5 g. When the polyaniline derivative thus obtained was analyzed by infrared absorption spectroscopy, an absorption of 2955 cm$^{-1}$ by the methyl groups of the substituted toluenesulfenyl groups was observed. From the yield of the reaction, the degree of substitution at the nitrogen atoms was found to be 37%.

The polyaniline derivative was soluble in N-methyl-2-pyrrolidone and also showed high solubility in organic solvents such as chloroform, dichloroethane, dichloromethane and tetrahydrofuran. From a solution of the polyaniline derivative in chloroform, a self-standing film was successfully obtained by casting. Its conductivity was 0.01 S/cm after having been doped with sulfuric acid.

Further, the film before the doping was successfully dissolved in organic solvents such as N-methyl-2-pyrrolidone, N,N-dimethylacetamide, chloroform, dichloroethane, dichloromethane and tetrahydrofuran.

EXAMPLE 5

A polyaniline derivative with sulfenamidated nitrogen atoms (1.7 g) was obtained in a similar manner to Example 4 except that o-nitrophenylsulfenyl chloride (1.04 g; 50 mol % relative to the nitrogen atoms of the reduced polyaniline) was used in lieu of p-toluenesulfenyl chloride. When the resultant polyaniline derivative was analyzed by infrared absorption spectroscopy, absorptions at 1520 cm$^{-1}$ and 1345 cm$^{-1}$ by nitro groups were observed. From the yield of the reaction, the degree of substitution at the nitrogen atoms was found to be 47%.

The polyaniline derivative was soluble in N-methyl-2-pyrrolidone and also showed high solubility in organic solvents such as chloroform, dichloroethane, dichloromethane and tetrahydrofuran. From a solution of the polyaniline derivative in chloroform, a self-standing film was successfully obtained by casting. Its conductivity was 0.01 S/cm after having been doped with sulfuric acid.

Further, the film before the doping was successfully dissolved in organic solvents such as N-methyl-2-pyrrolidone, N,N-dimethylacetamide, chloroform, dichloroethane, dichloromethane and tetrahydrofuran.

EXAMPLE 6

A polyaniline derivative with sulfenamidated nitrogen atoms (1.4 g) was obtained in a similar manner to Example 4 except that 1-octanesulfenyl chloride (0.99 g; 50 mol % relative to the nitrogen atoms of the reduced polyaniline) was used in lieu of p-toluenesulfenyl chloride. When the resultant polyaniline derivative was analyzed by infrared absorption spectroscopy, an absorption at 2955 cm$^{-1}$ by methyl groups and that at 2930 cm$^{-1}$ by methylene groups were observed. From the yield of the reaction, the degree of substitution at the nitrogen atoms was found to be 25%.

The polyaniline derivative was soluble in N-methyl-2-pyrrolidone and also showed high solubility in organic solvents such as chloroform, dichloroethane, dichloromethane and tetrahydrofuran. From a solution of the polyaniline derivative in chloroform, a self-standing film was successfully obtained by casting. Its conductivity was 0.05 S/cm after having been doped with sulfuric acid.

Further, the film before the doping was successfully dissolved in organic solvents such as N-methyl-2-pyrrolidone, N,N-dimethylacetamide, chloroform, dichloroethane, dichloromethane and tetrahydrofuran.

EXAMPLE 7

A reduced polyaniline (1 g) obtained in a similar manner to Example 1 was completely dissolved in N-methyl-2-pyrrolidone (30 ml). After the reaction system having been thoroughly purged with nitrogen gas, p-toluenesulfinyl chloride (0.96 g; 50 mol % relative to the nitrogen atoms of the reduced polyaniline) was added, followed by stirring for 6 hours so that they were reacted. The reaction mixture was poured into water (1 liter) while the resulting mixture was stirred. The resulting precipitate was collected by filtration, dried and then subjected to undoping treatment with aqueous ammonia, whereby a polyaniline derivative with sulfinamidated nitrogen atoms was obtained in an amount of 1.5 g. When the polyaniline derivative thus obtained was analyzed by infrared absorption spectroscopy, an absorption of 2955 cm$^{-1}$ by the methyl groups of the substituted toluenesulfinyl groups was observed. From the yield of the reaction, the degree of substitution at the nitrogen atoms was found to be 33%.

The polyaniline derivative was soluble in N-methyl-2-pyrrolidone and also showed high solubility in organic solvents such as chloroform, dichloroethane, dichloromethane and tetrahydrofuran. From a solution of the polyaniline derivative in chloroform, a self-standing film was successfully obtained by casting. Its conductivity was 0.01 S/cm after having been doped with sulfuric acid.

Further, the film before the doping was successfully dissolved in organic solvents such as N-methyl-2-pyrrolidone, N,N-dimethylacetamide, chloroform, dichloroethane, dichloromethane and tetrahydrofuran.

EXAMPLE 8

A polyaniline derivative with sulfinamidated nitrogen atoms (1.4 g) was obtained in a similar manner to Example 7 except that 1-butanesulfinyl chloride (0.78 g; 50 mol % relative to the nitrogen atoms of the reduced polyaniline) was used in lieu of p-toluenesulfinyl chloride. When the resultant polyaniline derivative was analyzed by infrared absorption spectroscopy, an absorption at 2955 cm$^{-1}$ by methyl groups and that at 2930 cm$^{-1}$ by methylene groups were observed. From the yield of the reaction, the degree of substitution at the nitrogen atoms was found to be 34%.

The polyaniline derivative was soluble in N-methyl-2-pyrrolidone and also showed high solubility in organic solvents such as chloroform, dichloroethane, dichloromethane and tetrahydrofuran. From a solution of the polyaniline derivative in chloroform, a self-standing film was successfully obtained by casting. Its conductivity was 0.05 S/cm after having been doped with sulfuric acid.

Further, the film before the doping was successfully dissolved in organic solvents such as N-methyl-2-pyrrolidone, N,N-dimethylacetamide, chloroform, dichloroethane, dichloromethane and tetrahydrofuran.

EXAMPLE 9

A polyaniline derivative with sulfinamidated nitrogen atoms (1.6 g) was obtained in a similar manner to Example 7 except that 1-octanesulfinyl chloride (1.1 g; 50 mol % relative to the nitrogen atoms of the reduced polyaniline) was used in lieu of p-toluenesulfinyl chloride. When the resultant polyaniline derivative was analyzed by infrared absorption spectroscopy, an absorption at 2955 cm$^{-1}$ by methyl groups and that at 2930 cm$^{-1}$ by methylene groups were observed. From the yield of the reaction, the degree of substitution at the nitrogen atoms was found to be 34%.

The polyaniline derivative was soluble in N-methyl-2-pyrrolidone and also showed high solubility in organic solvents such as chloroform, dichloroethane, dichloromethane and tetrahydrofuran. From a solution of the polyaniline derivative in chloroform, a self-standing film was successfully obtained by casting. Its conductivity was 0.05 S/cm after having been doped with sulfuric acid.

Further, the film before the doping was successfully dissolved in organic solvents such as N-methyl-2-pyrrolidone, N,N-dimethylacetamide, chloroform, dichloroethane, dichloromethane and tetrahydrofuran.

EXAMPLE 10

A polyaniline derivative with sulfinamidated nitrogen atoms (1.3 g) was obtained in a similar manner to Example 7 except that 1-benzylsulfinyl chloride (0.96 g; 50 mol % relative to the nitrogen atoms of the reduced polyaniline) was used in lieu of p-toluenesulfinyl chloride. When the resultant polyaniline derivative was analyzed by infrared absorption spectroscopy, an absorption at 2940 cm$^{-1}$ by methylene groups was observed. From the yield of the reaction, the degree of substitution at the nitrogen atoms was found to be 20%.

The polyaniline derivative was soluble in N-methyl-2-pyrrolidone and also showed high solubility in organic solvents such as chloroform, dichloroethane, dichloromethane and tetrahydrofuran. From a solution of the polyaniline derivative in chloroform, a self-standing film was successfully obtained by casting. Its conductivity was 0.05 S/cm after having been doped with sulfuric acid.

Further, the film before the doping was successfully dissolved in organic solvents such as N-methyl-2-pyrrolidone, N,N-dimethylacetamide, chloroform, dichloroethane, dichloromethane and tetrahydrofuran.

EXAMPLE 11

A reduced polyaniline (1 g) obtained in a similar manner to Example 1 was completely dissolved in N-methyl-2-pyrrolidone (30 ml). After the reaction system having been thoroughly purged with nitrogen gas, p-toluenesulfonyl chloride (1 g; 50 mol % relative to the nitrogen atoms of the reduced polyaniline) was added, followed by stirring for 6 hours so that they were reacted. The reaction mixture was poured into water (1 liter) while the resulting mixture was stirred. The resulting precipitate was collected by filtration, dried and then subjected to undoping treatment with aqueous ammonia, whereby a polyaniline derivative with sulfonamidated nitrogen atoms was obtained in an amount of 1.5 g. The sulfonamidation was confirmed by absorptions at 1350 cm$^{-1}$ and 1160 cm$^{-1}$ in an infrared absorption spectrum. From the yield of the reaction, the degree of substitution at the nitrogen atoms was found to be 29%.

The polyaniline derivative was soluble in N-methyl-2-pyrrolidone and also showed high solubility in organic solvents such as chloroform, dichloroethane, dichloromethane and tetrahydrofuran. From a solution of the polyaniline derivative in chloroform, a self-standing film was successfully obtained by casting. Its conductivity was 0.01 S/cm after having been doped with sulfuric acid.

Further, the film before the doping was successfully dissolved in organic solvents such as N-methyl-2-pyrrolidone, N,N-dimethylacetamide, chloroform, dichloroethane, dichloromethane and tetrahydrofuran.

EXAMPLE 12

A polyaniline derivative with sulfonamidated nitrogen atoms (1.1 g) was obtained in a similar manner to Example 11 except that 1-butanesulfonyl chloride (1.1 g; 50 mol % relative to the nitrogen atoms of the reduced polyaniline) was used in lieu of p-toluenesulfonyl chloride. The sulfonamidation was confirmed by absorptions at 1350 and 1160 cm$^{-1}$ in an infrared absorption spectrum. From the yield of the reaction, the degree of substitution at the nitrogen atoms was found to be 30%.

The polyaniline derivative was soluble in N-methyl-2-pyrrolidone and also showed high solubility in organic solvents such as chloroform, dichloroethane, dichloromethane and tetrahydrofuran. From a solution of the polyaniline derivative in chloroform, a self-standing film was successfully obtained by casting. Its conductivity was 0.05 S/cm after having been doped with sulfuric acid.

Further, the film before the doping was successfully dissolved in organic solvents such as N-methyl-2-pyrrolidone, N,N-dimethylacetamide, chloroform, dichloroethane, dichloromethane and tetrahydrofuran.

EXAMPLE 13

A polyaniline derivative with sulfonamidated nitrogen atoms (1.6 g) was obtained in a similar manner to Example 11 except that 1-octanesulfonyl choride (1.2 g; 50 mol % relative to the nitrogen atoms of the reduced polyaniline) was used in lieu of p-toluenesulfonyl chloride. The sulfonamidation was confirmed by absorptions at 1350 and 1160 cm$^{-1}$ in an infrared absorption spectrum. From the yield of the reaction, the degree of substitution at the nitrogen atoms was found to be 30%.

The polyaniline derivative was soluble in N-methyl-2-pyrrolidone and also showed high solubility in organic solvents such as chloroform, dichloroethane, dichloromethane and tetrahydrofuran. From a solution of the polyaniline derivative in chloroform, a self-standing film was successfully obtained by casting. Its conductivity was 0.05 S/cm after having been doped with sulfuric acid.

Further, the film before the doping was successfully dissolved in organic solvents such as N-methyl-2-pyrrolidone, N,N-dimethylacetamide, chloroform, dichloroethane, dichloromethane and tetrahydrofuran.

EXAMPLE 14

A polyaniline derivative with sulfonamidated nitrogen atoms (1.3 g) was obtained in a similar manner to Example 11 except that benzylsulfonyl choride (1 g; 50 mol % relative to the nitrogen atoms of the reduced polyaniline) was used in lieu of p-toluenesulfonyl chloride. The sulfonamidation was confirmed by absorptions at 1350 and 1160 cm$^{-1}$ in an infrared absorption spectrum. From the yield of the reaction, the degree of substitution at the nitrogen atoms was found to be 18%.

The polyaniline derivative was soluble in N-methyl-2-pyrrolidone and also showed high solubility in organic solvents such as chloroform, dichloroethane, dichloromethane and tetrahydrofuran. From a solution of the polyaniline derivative in chloroform, a self-standing film was successfully obtained by casting. Its conductivity was 0.05 S/cm after having been doped with sulfuric acid.

Further, the film before the doping was successfully dissolved in organic solvents such as N-methyl-2-pyrrolidone, N,N-dimethylacetamide, chloroform, dichloroethane, dichloromethane and tetrahydrofuran.

EXAMPLE 15

A reduced polyaniline (1 g) obtained in a similar manner to Example 1 was completely dissolved in N-methyl-2-pyrrolidone (30 ml). After the reaction system having been thoroughly purged with nitrogen gas, 2-bromoethyl ether ether (0.5 g) was added, followed by stirring for 6 hours so that they were reacted. The reaction mixture was poured into water (1 liter) while the resulting mixture was stirred. The resulting precipitate was collected by filtration, dried and then subjected to undoping treatment with aqueous ammonia, whereby an N-substituted polyaniline derivative was obtained in an amount of 1.2 g. When the polyaniline derivative thus obtained was analyzed by infrared absorption spectroscopy, an absorption of 2950 cm$^{-1}$ by methylene groups of the substituents was observed. From the yield of the reaction, the degree of substitution at the nitrogen atoms was found to be 29%.

The polyaniline derivative was soluble in N-methyl-2-pyrrolidone and also showed high solubility in organic solvents such as chloroform, dichloroethane, dichloromethane and tetrahydrofuran. From a solution of the polyaniline derivative in chloroform, a self-standing film was successfully obtained by casting. Its conductivity was 1.0 S/cm after having been doped with sulfuric acid.

Further, the film before the doping was successfully dissolved in organic solvents such as N-methyl-2-pyrrolidone, N,N-dimethylacetamide, chloroform, dichloroethane, dichloromethane and tetrahydrofuran.

EXAMPLE 16

A polyaniline derivative with sulfonamidated nitrogen atoms (1.1 g) was obtained in a similar manner to Example 15 except that diethyleneglycol bis(2-chloroethyl)ether (0.2 g) was used in lue of 2-bromoethyl ether. When thus-obtained polyaniline derivative was analyzed by infrared absorption spectroscopy, an absorption at 2950 cm$^{-1}$ by methylene group was observed. From the yield of the reaction, the degree of substitution at the nitrogen atoms was found to be 7%.

The polyaniline derivative was soluble in N-methyl-2-pyrrolidone and also showed high solubility in organic solvents such as chloroform, dichloroethane, dichloromethane and tetrahydrofuran. From a solution of the polyaniline derivative in chloroform, a self-standing film was successfully obtained by casting. Its conductivity was 0.05 S/cm after having been doped with sulfuric acid.

Further, the film before the doping was successfully dissolved in organic solvents such as N-methyl-2-pyrrolidone, N,N-dimethylacetamide, chloroform, dichloroethane, dichloromethane and tetrahydrofuran.

EXAMPLE 17

A polyaniline derivative with ether groups substituent (1.1 g) was obtained in a similar manner to Example 15 except that polyethyleneglycol bis(2-bromoethyl) ether (n=5) (0.1 g) was used in lieu of 2-bromoethyl ethyl ether. When the thus-obtained polyaniline derivative was analyzed by infrared absorption spectroscopy, an absorption at 2950 cm$^{-1}$ by methylene groups was observed. From the yield of the reaction, the degree of substitution at the nitrogen atoms was found to be 2%.

The polyaniline derivative was soluble in N-methyl-2-pyrrolidone and also showed high solubility in organic solvents such as chloroform, dichloroethane, dichloromethane and tetrahydrofuran. From a solution of the polyaniline derivative in chloroform, a self-standing film was successfully obtained by casting. Its conductivity was 0.5 S/cm after having been doped with sulfuric acid.

Further, the film before the doping was successfully dissolved in organic solvents such as N-methyl-2-pyrrolidone, N,N-dimethylacetamide, chloroform, dichloroethane, dichloromethane and tetrahydrofuran.

COMPARATIVE EXAMPLE

Aniline (4.1 g) and concentrated hydrochloric acid (21.9 g) were dissolved in water to give an aniline solution (100 ml). The aniline solution was chilled to $-5°$ C. Concentrated hydrochloric acid (21.9 g) and ammonium persulfate (6.28 g) were also dissolved in water to give a solution (100 ml). The latter solution was also chilled to $-5°$ C. and was then slowly added dropwise to the aniline solution, followed by stirring at $-5°$ C. for 4 hours. The thus-obtained polyaniline was washed thoroughly with water, followed by undoping treatment with aqueous ammonia.

The polyaniline thus obtained was soluble in N-methyl-2-pyrrolidone, and a self-standing film was successfully obtained from a solution of polyaniline in N-methyl-2-pyrrolidone. However, the polyaniline was insoluble in chloroform or tetrahydrofuran. Moreover, the self-standing film thus obtained was not soluble in any organic solvents.

I claim:

1. A polyaniline derivative represented by the following formula (I):

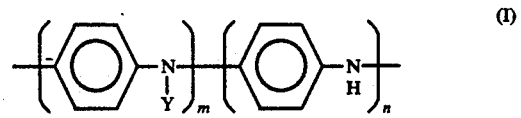

wherein Y is R$_5$+O—R$_4$)$_k$OR$_3$—, R$_3$ being a linear or branched alkylene group having 1-22 carbon atoms, R$_4$ being a linear or branched alkylene group having 1-22 carbon atoms, R$_5$ being a substituted or unsubstituted alkyl group having 1-22 carbon atoms or a cycloalkyl group, and k is an integer of 0-5, and n and m independently represent polymerization degrees and are integers satisfying the following equations: m/(n+m)=0.01-1 and n+m=20-1000.

2. A polyaniline derivative represented by the following formula(I):

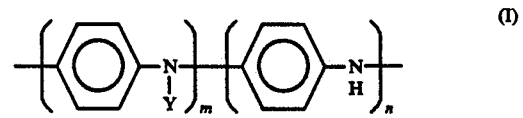

wherein Y is R$_2$S—, R$_2$ being a substituted or unsubstituted alkyl group having at least 2 carbon atoms, a substituted or unsubstituted alkenyl group, a substituted or unsubstituted aryl group or a substituted or unsubstituted benzyl group, and n and m independently represent polymerization degrees and are integers satisfying the following equations: m/(n+m)=0.01 to 1 and n+m=20 to 1000.

3. A polyaniline derivative represented by the following formula (I):

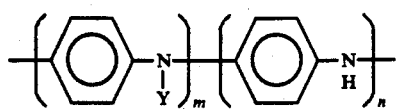 (I)

wherein Y is $R_2SO-$, $R_2$ being a substituted or unsubstituted alkyl group having at least 2 carbon atoms, a substituted or unsubstituted alkenyl group, a substituted or unsubstituted aryl group or a substituted or unsubstituted benzyl group, and n and m independently represent polymerization degrees and are integers satisfying the following equations: $m/(n+m)=0.01$ to 1 and $n+m=20$ to 1000.

* * * * *